United States Patent [19]

Fukuzumi

[11] Patent Number: 5,761,144
[45] Date of Patent: Jun. 2, 1998

[54] MEMORY CARD

[75] Inventor: Tomoya Fukuzumi, Tokyo, Japan

[73] Assignee: Mitsubishi Denki Kabushiki Kaisha, Tokyo, Japan

[21] Appl. No.: 627,132

[22] Filed: Apr. 3, 1996

[30] Foreign Application Priority Data

Oct. 12, 1995 [JP] Japan ................ 7-264202

[51] Int. Cl.$^6$ ............................................. G06F 12/14
[52] U.S. Cl. ......................... 365/226; 365/227; 365/228; 365/222
[58] Field of Search ................ 365/226, 227, 365/228, 222

[56] References Cited

U.S. PATENT DOCUMENTS

| | | | |
|---|---|---|---|
| 4,816,654 | 3/1989 | Anderl et al. | 235/380 |
| 4,882,474 | 11/1989 | Anderl et al. | 235/380 |
| 5,521,590 | 5/1996 | Hanaoka et al. | 340/825.54 |
| 5,553,294 | 9/1996 | Nanno et al. | 395/750 |

FOREIGN PATENT DOCUMENTS 1-276287  11/1989  Japan.

*Primary Examiner*—Viet Q. Nguyen

[57] ABSTRACT

A memory card includes a volatile memory device, and a power supply supplying an electric voltage to the memory device while the memory card is connected to a host. A timer is started when the memory card is connected to the system. A current detector detects a current flow between a pair of terminals connected to a host. A power supply controller provided between the memory device and the power supply opens repetitively when the current detector does not detect a prescribed current flow before the timer completes a prescribed timing cycle. Thus, the memory card can be accessed only when it is connected to a host having a security function in correspondence to the memory card, while it clears the data stored therein when it is connected to a host which does not correspond to the memory card. Preferably, the current detector is activated by an active signal received from a host. The memory card may also include a timer activated when the memory card is connected to the host or when an active signal is supplied from the host. The memory card also includes at least one pair of terminals connected to corresponding terminals of the host, a current detector detecting current flow between the terminals, and a power supply controller for opening repetitively between the memory device and the power supply when the current detector does not detect a prescribed current flow before the timer completes a prescribed timing cycle.

17 Claims, 5 Drawing Sheets

MEMORY CARD

BACKGROUND OF THE INVENTION

1. Field of the Invention

The present invention relates to a memory card having a security function which may be connected to a host computer or other memory card access devices.

2. Description of the Prior Art

A memory cards are known which may be connected to a host computer as an external storage medium therefor. Such known memory cards typically include a memory device such as a random access memory for storing data. The data in the memory card can be read by connecting it to the host computer.

However, a memory card may include secret data which have to be hidden from a third party. However, if the memory card satisfies industry standard specifications such as JAIDA (Japan Electronic Industry Development Association) or PCMCIA (Personal Computer Memory Card International Association) specification, it can be connected to a card slot of any computer possessing JAIDA or PCMCIA specification. Then, a person who obtains a memory card illegally or without proper authorization can access the data stored in the memory card easily. In other words, a memory card according to PCMCIA standard cannot prevent illegal or unauthorized access to the data stored therein if it is obtained by an unauthorized third party.

SUMMARY OF THE INVENTION

An object of the present invention is to provide a memory card having a security function for preventing illegal or unauthorized access thereto.

A memory card of the invention includes a volatile memory device, and a power supply supplying an electric voltage to the memory device while the memory card is connected to a system. A timer is started when the memory card is connected to the system. A current detector detects a current flow of a prescribed value between a pair of terminals when the memory card is connected to a host. A power supply controller provided between the memory device and the power supply opens repetitively when the current detector does not detect the prescribed current flow before the timer does not complete a prescribed timing curve. Thus, the invention memory card can be accessed only when it is connected to a host having a security function in correspondence to the memory card. Furthermore, the inventive memory card clears the data stored therein when it is connected to a host which does not correspond to the memory card. Preferably, the current detector for detecting a current flow between the pair of the terminals is activated by an active signal received from a host.

An advantage of the present invention is that illegal or unauthorized access to a memory card can be prevented. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
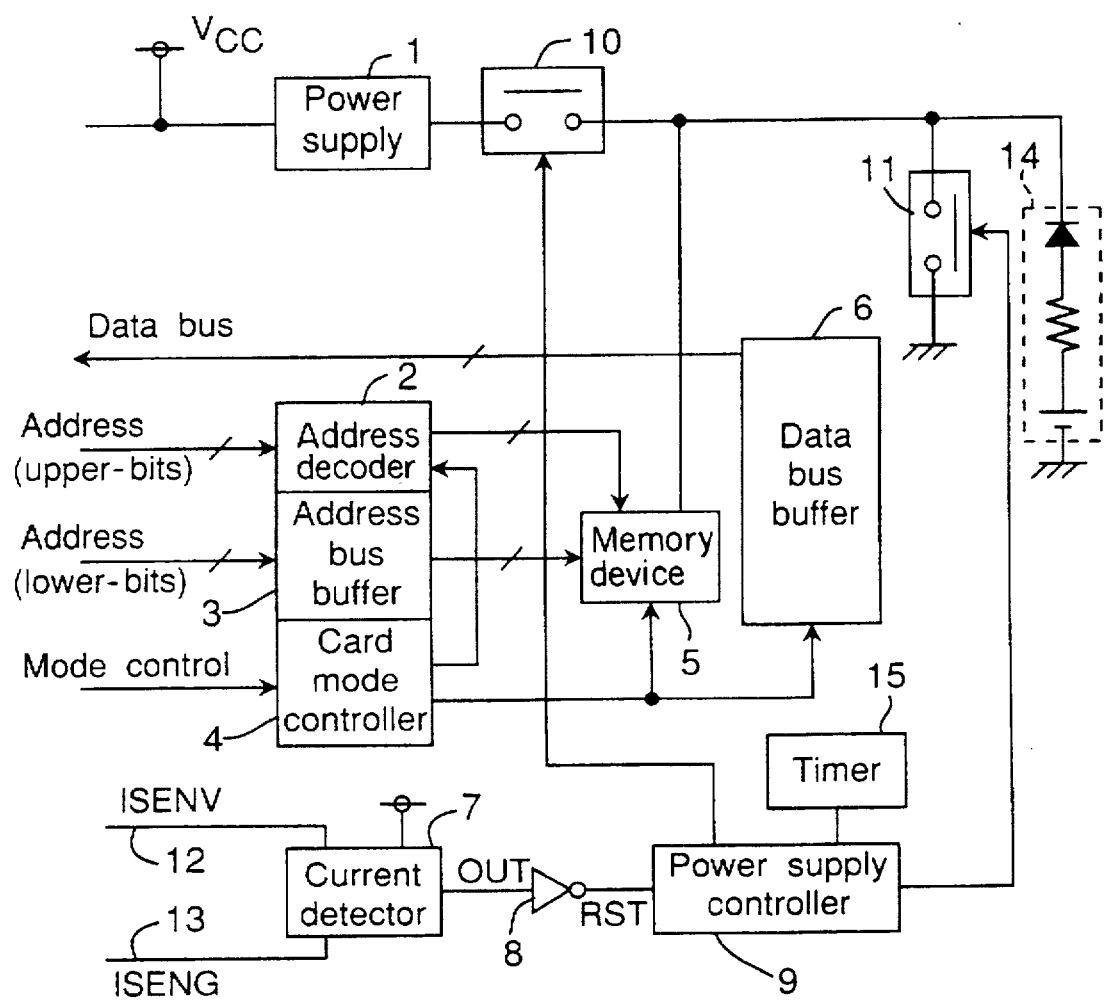
FIG. 1 is a block diagram of a memory card of an embodiment of the invention.

Referring now to the drawings, wherein like reference characters designate like or corresponding parts throughout the several views, FIG. 1 shows a block diagram of a memory card of an embodiment of the invention. A power supply 1 is connected through a first switch 10 to a memory device 5. The power supply 1 supplies a prescribed constant voltage $V_{cc}$ to the memory device 5 while the memory card is connected to a host such as a personal computer. (The power supply voltage $V_{cc}$ is also supplied to other components in the memory card when the memory card is connected to the host.) The switch 10 is closed by a power supply controller 9 when the memory card is connected to the host.

Further, the memory device 5 receives back-up power from a second power supply 14. A second switch 11 is connected to the power supply 14 and the memory device 5 on one side, while it is grounded on the other side. By closing the second switch 11, the back-up power supplied by the second power supply 14 for is cut off. The second switch 11 is opened when the memory card is connected to the host.

The memory device 5 also includes a plurality of volatile memory such as chips static random access memory (SRAM) which store data while the memory device 5 receives electric power from the power supplies (1 or 14). An address decoder 2 receives upper-bits of an address from the memory host, which designate a memory chip to be accessed among the memory chips in the memory device 5. An address bus buffer 3 receives lower-bits of the address from the host as an address data to be supplied to the memory chip designated by the upper-bits.

A data bus buffer 6 receives data from the memory device 5 and sends it to the host through a data bus.

A card mode controller 4 is connected to the memory device 5 and to the data bus buffer 6. The card mode controller 4 to be in controls the memory in card a write enable state or a read enable state according to a card mode control signal received from the host.

A current detector 7 sends a signal of H level to an inverter 8 when a current supplied by the host flows between ISENV and ISENG terminals 12, 13, as will be explained in detail later. The signal output by the current detector 7 is inverted by the inverter 8 and sent as a reset signal to the power supply controller 9. The power supply controller 9 sends a control signal of H level to the power supply switches 10 and 11 if a signal of L level is not received within a prescribed time period after the memory electric power is supplied to the card. A timer 15 is connected to the power supply controller 9, and it is started when the memory card is connected to the system.

When a control signal of L level is not received by the power supply controller 9 until after the timer completes a prescribed timing cycle, the switches 10 and 11 are opened repetitively by the power supply controller 9 at prescribed timings to cut-off power supply to the memory device 5, intermittently. Because the memory device 5 includes volatile memory chips, it loses all the data stored within when the electric power is cut-off.

By using the memory card having the above-mentioned structure, the data stored in the memory card cannot be read except by a host having a security function in correspondence to the memory card. That is, if the host has a function to initiate the prescribed flow the current between of terminals 12 and 13 within a prescribed time period, the host can then access the data in the memory card. As explained above, the switches 10 and 11 are disconnected not once, but repetitively. This prevents failures in the address decoder 2, the address bus buffer 3 and the card mode controller 4 when the switches are opened.

When a signal of L level is received by the power supply controller 9 within the prescribed time period after the electric power is turned on for the memory card, the power supply controller 9 outputs control signals of L level to the switches 10 and 11. Then, the first switch 10 maintains an on state, while the second switch 11 maintains an off state. Thus, the power supply 1 supplies an electric power to the memory device 5, and the host can access the memory device 5.

Figure 2:
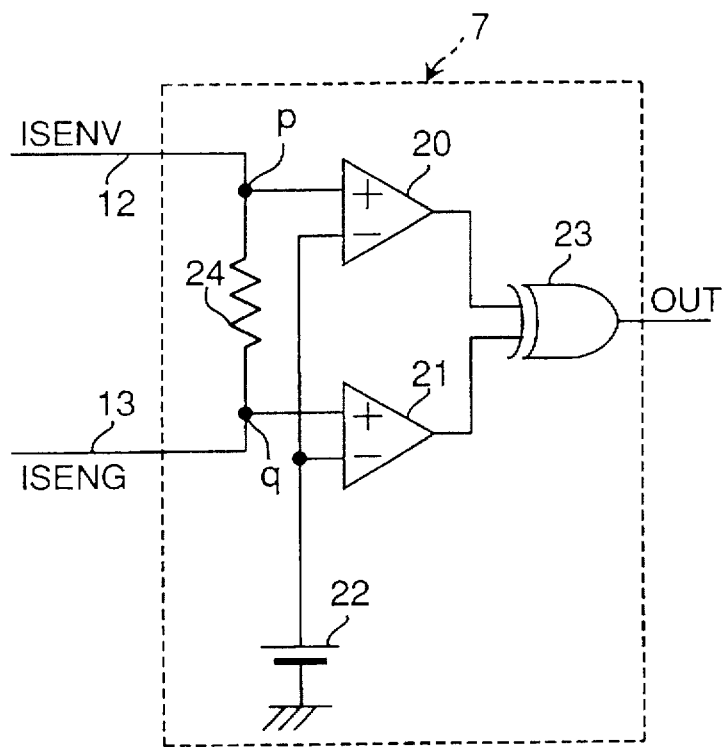
FIG. 2 is a circuit diagram of a current detector.

FIG. 2 shows an exemplary circuit diagram of the current detector 7 which sends a signal of H level when a current of a prescribed value flows between the ISENV and ISENG terminals 12, 13. A resistor 24 connects between the terminals 12 and 13, and two ends (p and q) of the resistor 21 are connected to noninverting (+) inputs of comparators 20 and 21. The inverting (−) inputs of the comparators 20 and 21 receive a threshold value $V_{TH}$ supplied by a constant voltage source 22.

A host having the inventive security function in correspondence to the inventive memory card indicates a prescribed current between the ISENV and ISENG terminals 12 and 13. If a potential at the point p is equal to or larger than the threshold value $V_{TH}$, the comparator 20 outputs a signal of H level. Similarly, if a potential at the point q is equal to or larger than the threshold value $V_{TH}$, the other comparator 21 outputs a signal of H level. The resistance of the resistor 24 and the threshold values $V_{TH}$ are set so that the comparators 20 and 21 output different signals from each other according to a voltage drop at the resistor 24 when the prescribed current flows between the ISENV and ISENG terminals 12 and 13. A output signals of the two comparators 20 and 21 are sent to an EXOR gate 23. When the prescribed current flows between the ISENV and ISENG terminals 12 and 13 or when one of the comparators 20 and 21 sends a signal of H level while the other sends a signal of L level, the EXOR gate 23 outputs a signal of H level. On the other hand, when a current does not flow between the ISENV and ISENG terminals 12 and 13 or when the current value is smaller or larger than the prescribed current value to output a voltage smaller or larger than $V_{TH}$, both comparators 20 and 21 output signals of H level and the EXOR gate 23 outputs a signal of L level.

Figure 3:
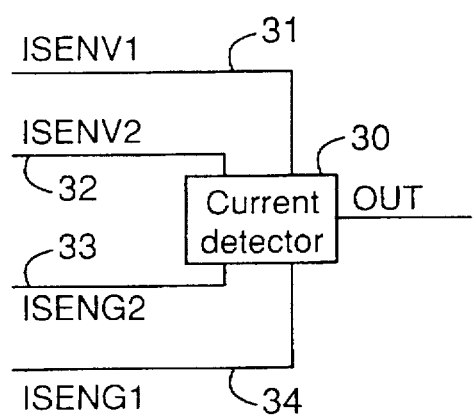
FIG. 3 is a block diagram of another example of a current detector.

FIG. 3 shows a current detector 30 as a modified example of the current detector 7. The current detector 30 outputs a signal of H level when a first prescribed current flows between terminals of ISENV1 31 and ISENG1 34 and a second prescribed current flows between terminals of ISENV2 32 and ISENG2 32. A host which has a security function in correspondence to the memory card initiates the first and second prescribed currents between the ISENV1 and ISENG1 terminals 31, 34 and between the ISENV2 and ISENG2 terminals 32, 33, respectively. The first and second prescribed currents may be different from each other. Then, if the first and second prescribed currents flow through the two pairs of terminals, the current detector 30 outputs a signal to H level, and access of data in the memory card is permitted.

Figure 4:
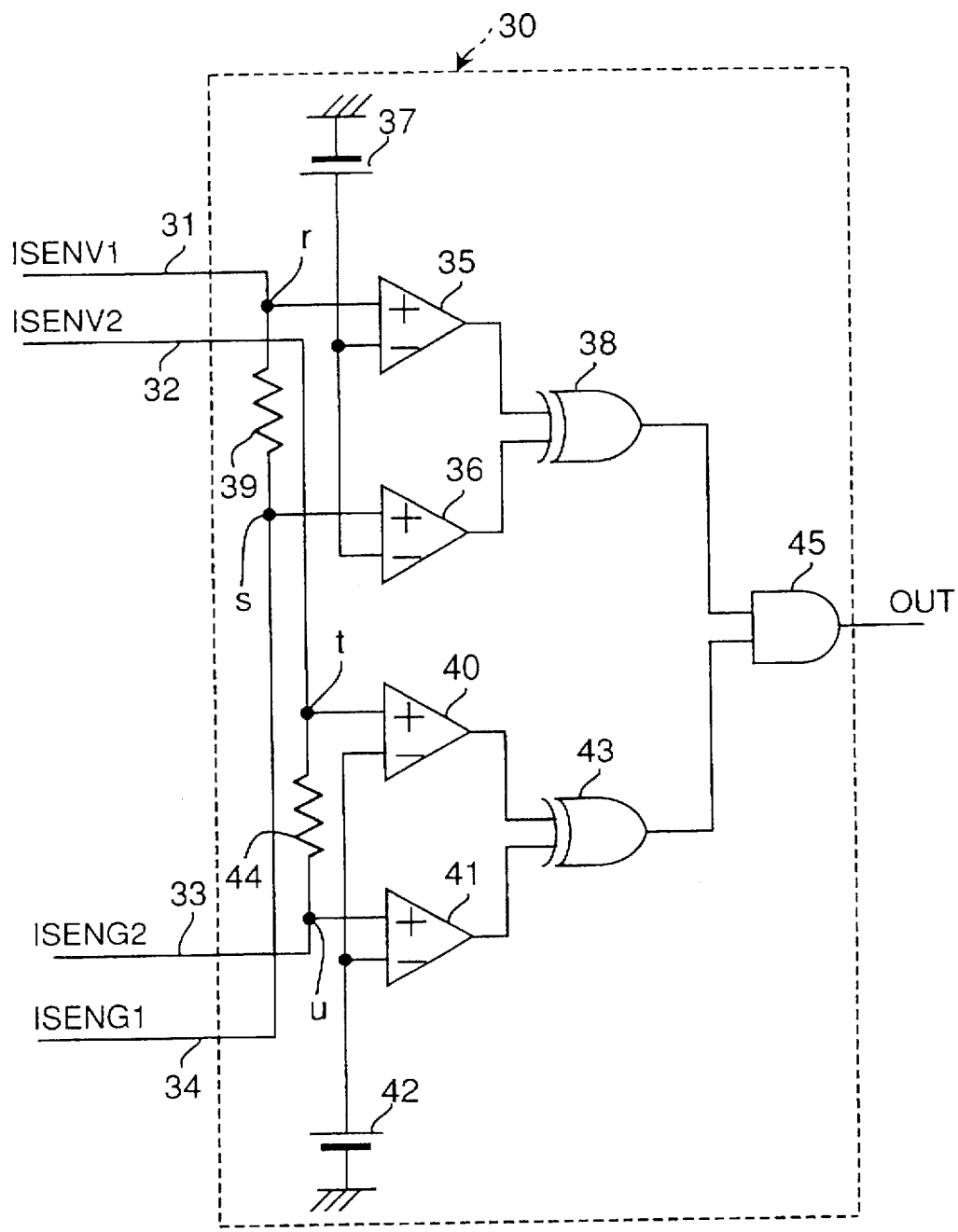
FIG. 4 is a circuit diagram of the another example of the current detector.

FIG. 4 shows the current detector 30 in detail. The current detector 30 is a combination of two current detectors from FIG. 2. That is, a first current detection section includes a resistor 39 connected between the ISENV1 and ISENG1 terminals 31, 34, a comparator 35 comparing a potential at a point r and a reference potential $V1_{TH}$ set by a constant voltage source 37, another comparator 36 comparing a potential at a point s and the reference potential $V1_{TH}$, and an EXOR gate 38 receiving outputs of the two comparators 35, 36. Similarly, a second current detection section includes another resistor 44 provided between the ISENV2 and ISENG2 terminals 32, 33, a comparator 40 comparing a potential at a point t and a reference potential $V2_{TH}$ set by a constant voltage source 42, another comparator 41 comparing a potential at a point u and the reference potential $V2_{TH}$, and an EXOR gate 43 receiving outputs of the two comparators 40, 41.

The current detector 30 further includes an AND gate 45 receiving output signals of the two EXOR gates 38 and 43. That is, the AND gate 45 outputs a signal of H level only when the first and second prescribed currents flows between the ISENV1 and ISENG1 terminals 31, 34 and between the ISENV2 and ISENG2 terminals 32, 33 for the EXOR gates 38 and 43 to output signals of H level. In this example, the current detector 30 outputs a signal of H level only when the first and second prescribed currents are flow between the ISENV1 and ISENG1 terminals 31, 34 and between the ISENV2 and ISENG2 terminals 32, 33. However, by replacing the AND gate 45 with an OR gate, the current detector 30 may be designed to output a signal of H level when the first prescribed current flows between the ISENV1 and ISENG1 terminals 31, 34 or when the second prescribed current between the ISENV2 and ISENG2 terminals 32, 33. Thus, data in the memory device 5 can be prevented from being cleared erroneously when a trouble on access with the host occurs.

It is also possible to provide a memory card which has three or more pairs of terminals, so that only if three or more prescribed currents flow through the terminals, will the current detector output a signal of H level. Then, data in the memory card can be provided with even greater security.

Figure 5:
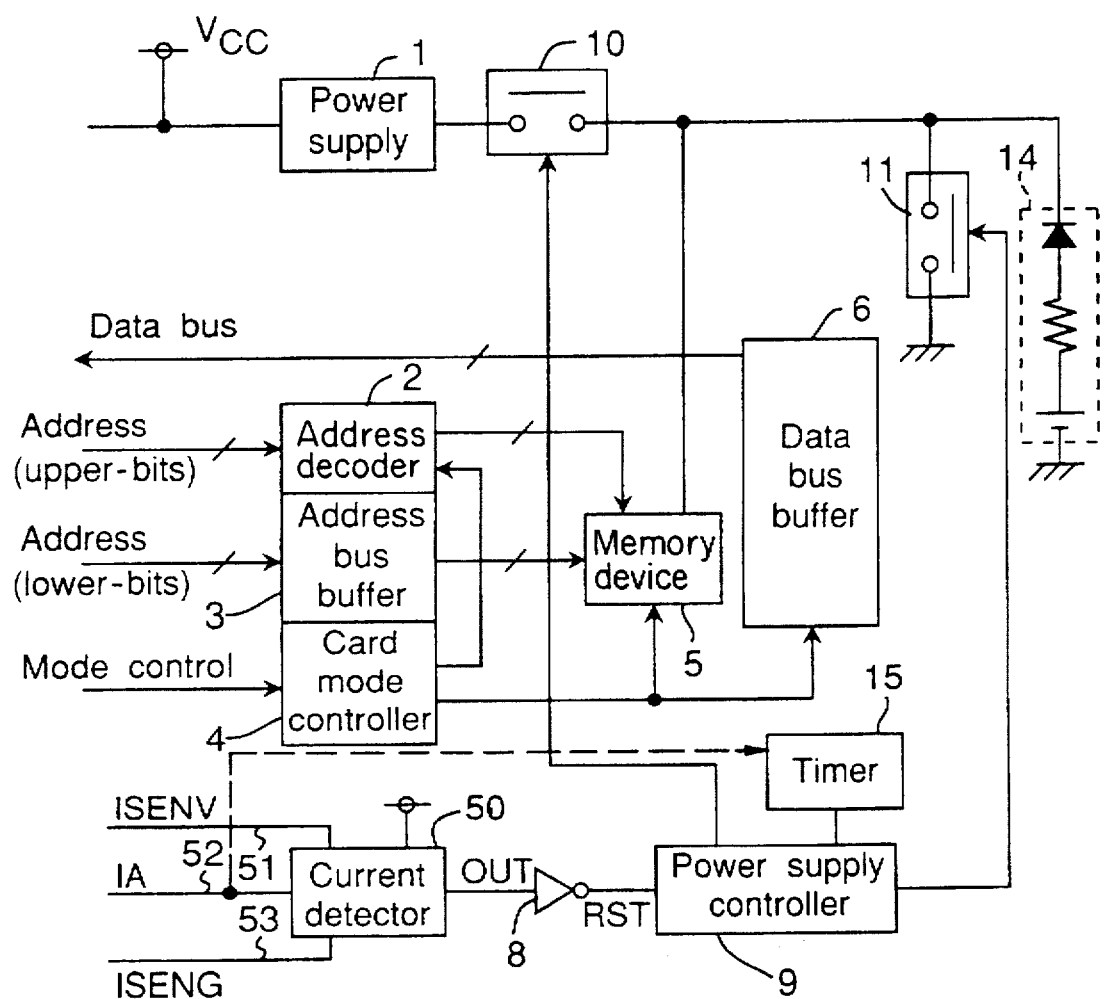
FIG. 5 is a block diagram of a memory card of another embodiment.

FIG. 5 shows a block diagram of a memory card of another embodiment of the invention. This memory card is different from that shown in FIG. 1 in that a current detector 50 receives from the host an active signal IA which activates the current detector 50. The current detector 50 has an active signal terminal 52 and an AND gate 58 receiving the active signal IA and an output of the EXOR gate 23 in addition to the structure of the current detector 7. A host outputs a signal IA of H level at the active signal terminal 52 after the memory card is connected thereto and before the timer 15 of the power supply controller 9 completes the prescribed timing cycle. The current detector 50 outputs a signal of H level only when the signal IA of H level is received at the active signal terminal 52 and the prescribed current flows between the ISENV and ISENG terminals 51, 52. By using the memory card having the above-mentioned structure, the data stored in the card cannot be read except by a host having a security function in correspondence to the memory card. That is, if the host has a function to initiate the prescribed current between the terminals 51 and 53 within a time period and to supply an activation signal IA at the terminal 52, it can access the data in the card. Because the active signal IA is needed to supply an electric power to the memory card, the security of the memory card increases. By using the current detector 50, a malfunction of the current detector 50 due to noises or the like can be prevented, and the data in the memory device 5 can be protected with even greater security.

Figure 6:
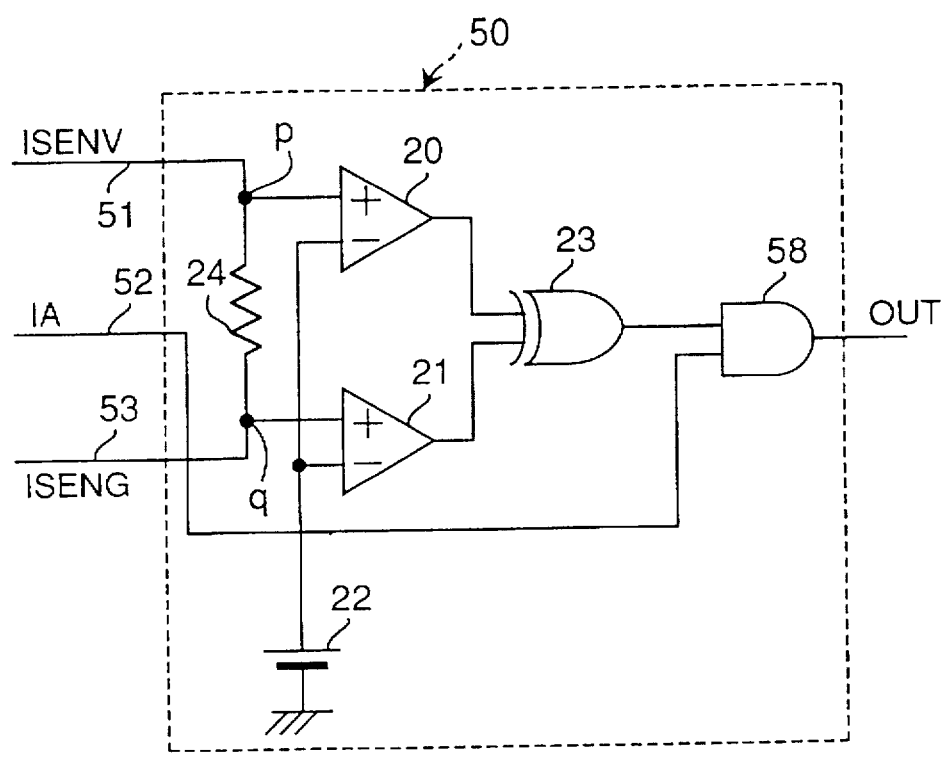
FIG. 6 is a circuit diagram of the current detector which may be used with the memory card shown in FIG. 5.

FIG. 6 shows a circuit diagram of the current detector 50 in detail. The terminals 51 and 53 are connected by a resistor 57. A host, correlated to the memory card and having the security function, outputs an active signal IA of H level to the active signal terminal 52 and initiates a prescribed current between the ISENV and ISENG terminals 51 and 53 at a predetermined timing after the memory card is connected and before the timer of the power supply controller 9 the prescribed timing cycle. If a potential at a point p is equal to or larger than a threshold value $V_{TH}$ set by a constant voltage source 22, a comparator 20 outputs a signal of H level. Similarly, if a potential at a point q is equal to or larger than the threshold value $V_{TH}$, another comparator 21 outputs a signal of H level. The resistance of the resistor 24 and the threshold values $V_{TH}$ are set so that the comparators 20 and 21 output different signals from each other according to a voltage drop at the resistor 24 when the prescribed current flows between the ISENV and ISENG terminals 51 and 53. The signals output by the comparators 20 and 21 are sent to an EXOR gate 23. When the prescribed current flows between the ISENV and ISENG terminals 51 and 53 or when one of the comparators 20 and 21 sends a signal of H level while the other sends a signal of L level, the EXOR gate 23 outputs a signal of H level. On the other hand, when a current does not flow between the ISENV and ISENG terminals 51 and 53 or when the current value is smaller or larger than the prescribed current value to output a value smaller or larger than $V_{TH}$, both comparators 20 and 21 output signals of H level and the EXOR gate 23 outputs a signal of L level. An AND gate 58 outputs a signal of H level only when an active signal of H level is received and signal of H level is output by the EXOR gate 56.

Alternately, if timer 15 in the memory card is set to be activated in correspondence to an active signal IA of H level received at the active signal terminal 52, the memory card can be checked at a particular timing, for example, when the host accesses the memory, except a timing when the electric power is supplied. In this case, the active signal IA at the terminal 52 is also supplied to the timer 15, which is shown by a dotted line in FIG. 5 indicating that this connection is optional. Thus, the current detector 50 can protect data in the memory device 5 with even greater security than in the current detectors 7, 30 and 50 explained above, by detecting the current supply at a timing different from those in the current detectors 7, 30 and 50.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A memory card comprising:

a volatile memory device;

a pair of first terminals which may be connected to the host;

a power supply supplying an electric voltage to said memory device while the memory card is connected to a host through said pair of first terminals;

a timer started when a condition occurs;

at least one pair of second terminals which may be connected to the host, said second terminals being different from said pair of first terminals;

a current detector detecting a current flow between the pair of the second terminals when the pair of second terminals is connected to the host; and a power supply controller opening a path repetitively between said memory device and said power supply when said current detector does not detect a current flowing between the pair of the second terminals before said timer completes a prescribed timing cycle.

2. The memory card according to claim 1, wherein the condition is connecting the memory card to the host and said timer starts when at least one terminal is connected to the host.

3. The memory card according to claim 2, wherein said power supply comprises a switch to stop power supply to said memory device, and said power supply controller opens repetitively the switch when said current detector does not detect a prescribed current before said timer completes the prescribed timing cycle.

4. The memory card according to claim 2, wherein said current detector detects a prescribed current flow between the pair of the terminals.

5. The memory card according to claim 2, further comprising a back up power supply including another switch to stop power supply by the back up power supply to said memory device, and said power supply controller opens said another switch when said card is connected to the host.

6. The memory card according to claim 2, wherein said current detector includes a resistor connecting the pair of the terminals, and said power supply controller detects a prescribed current flow through the resistor according to potentials at two ends of the resistor.

7. The memory card according to claim 2, further comprising two or more pairs of said terminals, wherein said current detector detects a current flow between each pair of said terminals.

8. The memory card according to claim 2, further comprising two or more pairs of said terminals, wherein said current detector detects a current flow between at least one pair of said terminals.

9. The memory card according to claim 1, wherein the condition is connecting the memory card to the host and said timer starts when at least one terminal is connected to the host, the memory card further comprising:

an active signal terminal receiving an active signal from the host;

said current detector further detecting the active signal received at the active signal terminal; and said power supply controller opening the path repetitively between said memory device and said power supply when said current detector does not detect a current flow between the pair of terminals and when said current detector does not detect the active signal at the active signal terminal.

10. The memory card according to claim 9, wherein said power supply includes a switch to stop power supply to said memory device, and said power supply controller opens repetitively the switch when said current detector does not detect a current flow between the pair of terminals before said timer completes a prescribed timing cycle.

11. The memory card according to claim 9, wherein said current detector detects a current flow of a prescribed value between the pair of the terminals.

12. The memory card according to claim 9, further comprising a back up power supply including another switch to stop power supply by the back up power supply to said memory device, and said power supply controller opens said another switch when the memory card is connected to the host.

13. The memory card according to claim 1, further comprising:

an active signal terminal receiving an active signal from the host;

said current detector further detecting the active signal received at the active signal terminal; and said power supply controller opening the path repetitively between said memory device and said power supply when said current detector does not detect a current flow between the pair of terminals and when said current detector does not detect the active signal at the active signal terminal, wherein the condition is receiving the active signal at said active signal terminal, said timer starting when the active signal is received at said active signal terminal.

14. The memory card according to claim 13, wherein said power supply includes a switch to stop power supply to said memory device, and said power supply controller opens repetitively the switch when said current detector does not detect a current flow between the pair of terminals before said timer completes the prescribed timing cycle.

15. The memory card according to claim 13, wherein said current detector detects a current flow of a prescribed value between the pair of the terminals.

16. The memory card according to claim 13, further comprising a back up power supply including another switch to stop power supply by the back up power supply to said memory device, and said power supply controller opens said another switch when the memory card is connected to the host.

17. The memory card according to claim 13, said at least one pair of terminals including a first and second pair of terminals, said current detector detecting a first current flow between said first pair of terminals and detecting a second current flow between said second pair of terminals, said power supply controller opening the path repetitively between said memory device and said power supply when said current detector does not detect a first prescribed current between said first pair of terminals and a second prescribed current between said second pair of terminals before said timer completes a prescribed timing cycle.

* * * * *